(12) United States Patent
Mohamed Arsad et al.

(10) Patent No.: US 9,007,230 B1
(45) Date of Patent: Apr. 14, 2015

(54) METHOD AND SYSTEM FOR DETERMINING STORAGE DEVICE TOP COVER COMPRESSION EFFECTIVENESS

(75) Inventors: Muhd 'Adi Saifuddin Mohamed Arsad, Kajang-Selangor (MY); Ai Ling Ng, Petaling Jaya-Selangor (MY)

(73) Assignee: Western Digital Technologies, Inc., Irvine, CA (US)

( * ) Notice: Subject to any disclaimer, the term of this patent is extended or adjusted under 35 U.S.C. 154(b) by 429 days.

(21) Appl. No.: 13/467,878

(22) Filed: May 9, 2012

(51) Int. Cl.
  *G08B 21/00* (2006.01)
  *G08B 21/18* (2006.01)
(52) U.S. Cl.
  CPC ...................................... *G08B 21/18* (2013.01)
(58) Field of Classification Search
  USPC ........ 340/687, 506, 545.6, 540, 686.1, 686.2, 340/686.4, 691.1, 693.5
  See application file for complete search history.

(56) References Cited

U.S. PATENT DOCUMENTS

| | | | | |
|---|---|---|---|---|
| 4,288,684 | A | * | 9/1981 | Katou et al. ................... 392/335 |
| 6,229,107 | B1 | * | 5/2001 | Flint et al. ................... 200/51.09 |
| 7,641,484 | B2 | * | 1/2010 | Cha et al. ...................... 439/138 |
| 2010/0089125 | A1 | | 4/2010 | Siriowatana et al. |

* cited by examiner

Primary Examiner — Daryl Pope

(57) ABSTRACT

A verification system including a block gage configured to connect to a voltage source comprising a ground terminal and a positive terminal, and to receive a top cover configured to mate with a base unit for a storage device. The block gage includes a plurality of pins, each of which being configured to: be electrically insulated from each other, form a completable circuit, be electrically connected to the positive terminal, and correspond in location and height to a top cover contact point in the base unit or a keep out point in the base unit. The block gage includes a spring mounted probe configured to be electrically connected to the ground terminal, wherein when the top cover contacts the spring mounted probe and a pin of the plurality of pins, a completable circuit for the contacted pin is completed, thereby indicating that the top cover contacted the contacted pin.

19 Claims, 4 Drawing Sheets

METHOD AND SYSTEM FOR DETERMINING STORAGE DEVICE TOP COVER COMPRESSION EFFECTIVENESS

BACKGROUND

During a conventional process to manufacture a storage device, a compression tool applies force to a top cover to compress the top cover and a form-in-place-gasket ("FIPG") to ensure that there is metal-to-metal contact between the top cover and a base unit. A metal-to-metal contact is desirable because it reduces a necessity for additional force to be applied to top cover screws to secure the top cover to the base unit. Furthermore, the compression of the top cover and the FIPG onto the base unit forms a FIPG seal, which isolates the air inside the storage device from outside the storage device to reduce contamination on one or more components within the storage device. Thus, full compression of the top cover with respect to the base unit as evidenced by the metal-to-metal contact also ensures that the FIPG seal is fully functional.

However, metal-to-metal contact between the top cover and the base unit is only desirable in certain areas, such as where the top cover screws will be used to secure the top cover to the base unit. In other areas, such as where the storage media, the disk clamp, or the head stack assembly are located, metal-to-metal contact is undesirable as such contact may damage the storage media, the disk clamp, or the head stack assembly.

Conventionally, to determine whether there is a metal-to-metal contact, an operator places a shim or paper strips between the top cover and the base unit. Then the top cover was compressed onto the base unit by the compression tool. If the operator is unable to pull out the shim or paper strips, then the top cover was considered to be sufficiently compressed onto the base unit to provide the metal-to-metal contact. Otherwise, an amount of force supplied by the compression tool was adjusted to ensure that there was sufficient compression by the top cover onto the base unit.

However, such a method was often inaccurate as the placement of the shim or paper strips altered an amount of force required to compress the top cover onto the base unit. Thus, in normal production without the shim or paper strips, the top cover may not be properly compressed onto the base unit. Furthermore, placement of the shim or paper strips inside a perimeter of the FIPG perimeter required the top cover or the base unit to be modified. In addition, such a conventional method may prove inadequate when determining whether too much compression has occurred, especially in areas inside the perimeter of the FIPG. This could lead to damage of components of the storage device, such as the storage media, the disk clamp, or the head stack assembly.

Thus, there is a need for a method and system for determining storage device top cover compression effectiveness.

BRIEF DESCRIPTION OF THE DRAWINGS

The features and advantages of the present embodiments will become more apparent from the detailed description set forth below when taken in conjunction with the drawings, wherein.

DETAILED DESCRIPTION

Figure 1:
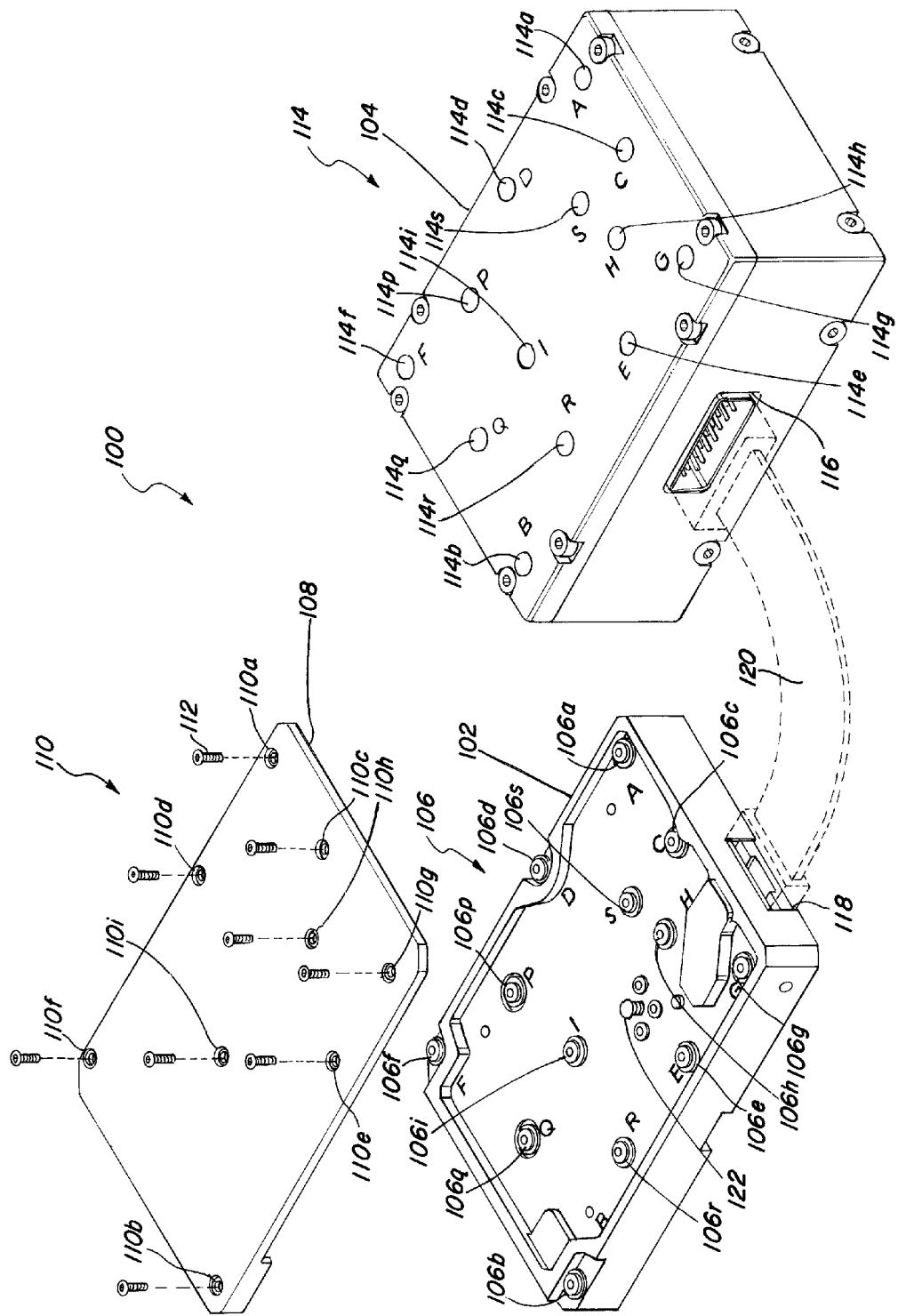
FIG. 1 depicts a verification system including a block gage and a display unit according to an embodiment.

In an embodiment, as seen in FIG. 1, a verification system 100 includes a block gage 102 and a display unit 104. Optionally, the verification system 100 can also include a top cover 108.

The top cover 108 can include, for example, fastener holes 110 such as fastener holes 110a-110i, where fasteners 112 can be placed through the fastener holes 110 to secure the top cover 108 to a base unit (not shown) of a storage device. In an embodiment, the storage device can be, for example, a disk drive.

In an embodiment, the top cover 108 can be sized and shaped, for example, to mate with the base unit. In an embodiment, the base unit can have a FIPG to isolate the air inside the base unit, which can be compressed when the top cover 108 is compressed onto the base unit. For example, the top cover 108 can be compressed using a compression tool (not shown), onto the base unit. While the fasteners 112 in FIG. 1 are depicted as screws, in an embodiment, the fasteners 112 can be any combination of screws, studs, bolts, or any other locking mechanisms which can secure the top cover 108 to the base unit.

In an embodiment, the block gage 102 simulates the base unit. That is, the block gage 102 can, for example, simulate heights and locations of the base unit which are top cover contact points and keep out points, which will be explained in more detail below. In an embodiment, the block gage 102 can replace the base unit for verification of the forces supplied by the compression tool. Furthermore, the top cover 108 can, for example, mate with the block gage 102.

The block gage 102 includes, for example, a spring mounted probe 122 and a plurality of pins 106, such as pins 106a-106i, and 106p-106s. In an embodiment, the spring mounted probe 122 is electrically connected to a negative terminal of a voltage source, while the pins 106 are electrically connected to a positive terminal of a voltage source, which will be described in more detail below. In an embodiment, the pins 106 can be electrically isolated from each other, which will be explained in more detail below.

In an embodiment the pins 106a-106i correspond in location and height to a top cover contact point in the base unit, while the pins 106p-106s correspond in location and height to a keep out point in the base unit. The top cover contact points in the base unit correspond, for example, to points in the base unit where the top cover should contact the base unit. In an embodiment, such contact between the top cover 108 and the base unit can be, for example, a metal-to-metal contact. The metal-to-metal contact at the top cover contact points can prevent, for example, particles from entering the hard disk assembly, thus reducing contamination.

In an embodiment, a top cover contact point is a fastener reception unit. The fastener reception unit can receive the fasteners 112 and correspond in location to the fastener holes 110a-110i of the top cover 108. In an embodiment, the keep out point in the base unit comprises a location in the base unit where the top cover should not contact the base unit. For example, the location can comprise a location of a storage media, a disk clamp, or a head stack assembly. In such a case, metal-to-metal contact may be undesirable as they may result in damage to the storage media, the disk clamp, the head stack assembly, or other components which may be susceptible to damage due to increased pressure on the component.

In an embodiment, the spring mounted probe 122 has a height greater than the pins 106, such that the top cover 108 contacts the spring mounted probe 122 before contacting the pins 106. In an embodiment, the spring mounted probe 122 can be compressed to allow the top cover 108 to contact the pins 106 after the top cover 108 contacts the spring mounted probe 122.

In an embodiment, the block gage 102 includes a connection unit 118, which allows the block gage 102 to connect to a connection unit 116 in the display unit 104 via a cable 120. Although a cable 120 is shown in FIG. 1, in an embodiment, the block gage 102 can also be connected to the display unit 104 via a wireless connection.

In an embodiment, the display unit 104 includes a plurality of top cover contact indicators 114, such as top cover contact indicators 114*a*-114*i*, and 114*p*-114*s*. The top cover contact indicators 114 correspond to the pins 106 and indicate when the top cover 108 contacts the corresponding pin. For example, the top cover indicators 114*a*-114*i*, and 114*p*-114*s* correspond to the pins 106*a*-106*i*, and 106*p*-106*s*, respectively. Furthermore, the top cover indicators 114*a*-114*i*, and 114*p*-114*s* indicate when the top cover 108 contacts the pins 106*a*-106*i*, and 106*p*-106*s*. Thus, when the top cover 108 contacts the pin 106*a*, the top cover indicator 114*a* will indicate that the contact has occurred.

In an embodiment, the top cover indicators 114 includes a first set of top cover indicators, each of which being configured to correspond to a pin that is configured to correspond in location and height to the top cover contact point, and a second set of top cover indicators, each of which being configured to correspond to a pin that is configured to correspond in location and height to the keep out point. For example, the first set of top cover indicators can include the top cover indicators 114*a*-114*i*, which correspond to the pins 106*a*-106*i*, while the second set of top cover indicators can include the top cover indicators 114*p*-114*s*, which correspond to the pins 106*p*-106*s*.

In an embodiment, the first set of top cover indicators can include a first set of light emitting diodes ("LEDs") comprising a first color, while the second set of top cover indicators can include a second set of LEDs comprising a second color different than the first color. For example, when the top cover 108 contacts the pin 106*a*, the top cover indicator 114*a* lights up with the first color. Likewise, when the top cover 108 contacts the pin 106*p*, the top cover indicator 114*p* lights up with the second color. In an embodiment, the first color is green, while the second color is red.

In an embodiment, the display unit 104 can be, for example, a monitor, and the top cover indicators 114 can be pixels or images displayed on the display unit 104. Furthermore, the top cover indicators 114 can also provide an audio indication in addition or instead of a visual indication that the top cover 108 has contacted or not contacted one or more of the pins 106.

Figure 6:
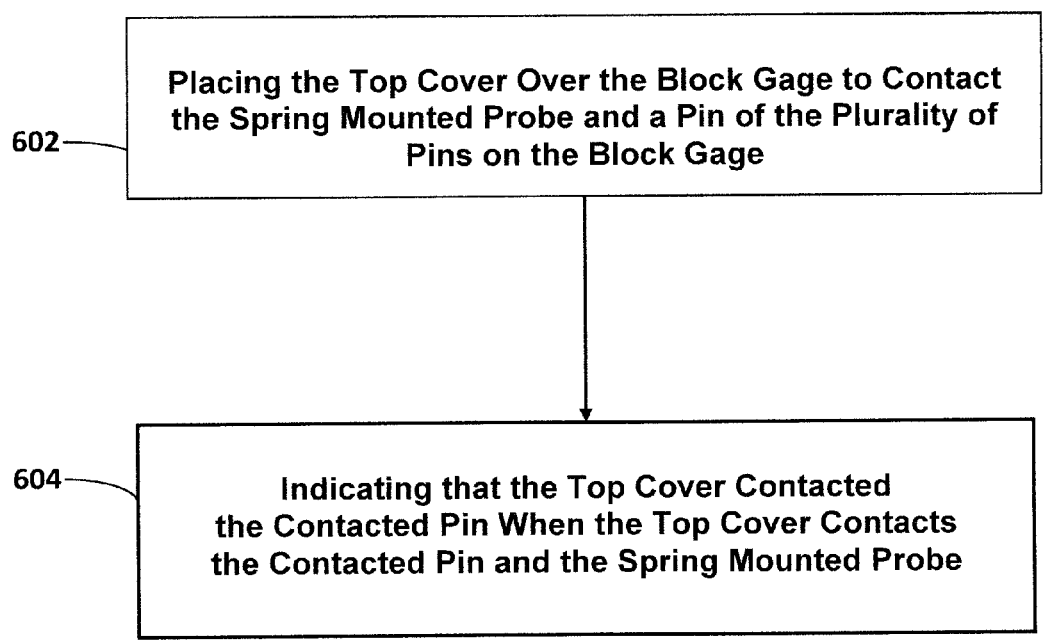
FIG. 6 depicts a process according to an embodiment.

In an embodiment, the verification system 100 can be used to determine storage device top cover compression effectiveness as shown in FIG. 6. In step 602, the top cover 108 is placed over the block gage 102 to contact the spring mounted probe 122 and a pin, such as the pin 106*h*.

Figure 2:
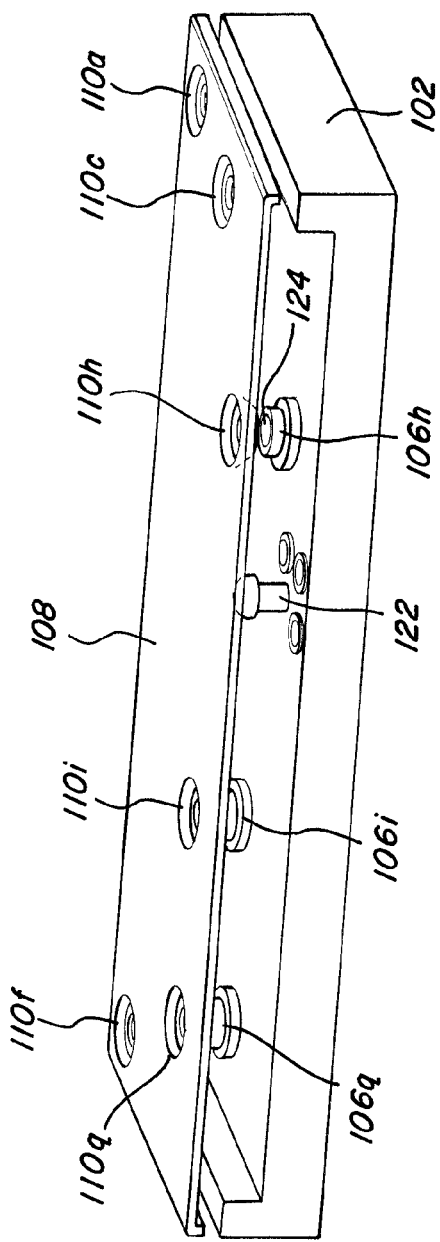
FIG. 2 depicts a top cover contacting a spring mounted probe in a block gage according to an embodiment.
Figure 3:
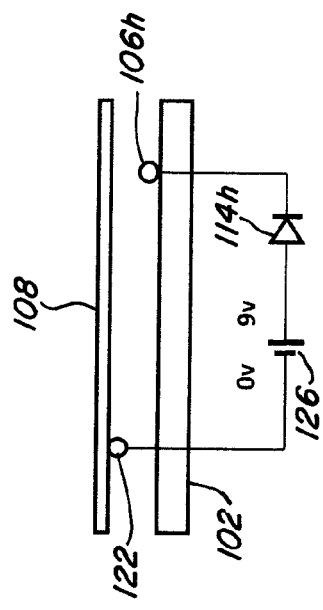
FIG. 3 depicts a circuit diagram of a top cover contacting a spring mounted probe in a block gage according to an embodiment.

In an embodiment shown in FIGS. 2 and 3, the top cover 108 contacts the spring mounted probe 122, but has not contacted the pin 106*h*, yet, as indicated by a gap 124 between the top cover 108 and the pin 106*h*. In an embodiment, FIG. 3 depicts a circuit diagram of the top cover 108 contacting the pin 106*h*, but not the spring mounted probe 122. As can be seen in FIG. 3, the pin 106*h* forms a completable circuit where the spring mounted probe 122 is electrically connected to a ground terminal of a voltage source 126, and the pin 106*h* is electrically connected to a positive terminal of the voltage source 126. Furthermore, the top cover contact indicator 114*h* is connected between the positive terminal and the pin 106*h*.

Such a connection can be supplied, for example, using the cable 120 or other connection between the connection unit 118 and the connection unit 116 as shown in FIG. 1. In an embodiment, the voltage source 126 could be located in the block gage 104, or in the display unit 106. In an embodiment, the voltage source 126 comprises a battery, a connection to an external power supply, or any combination thereof.

Figure 4:
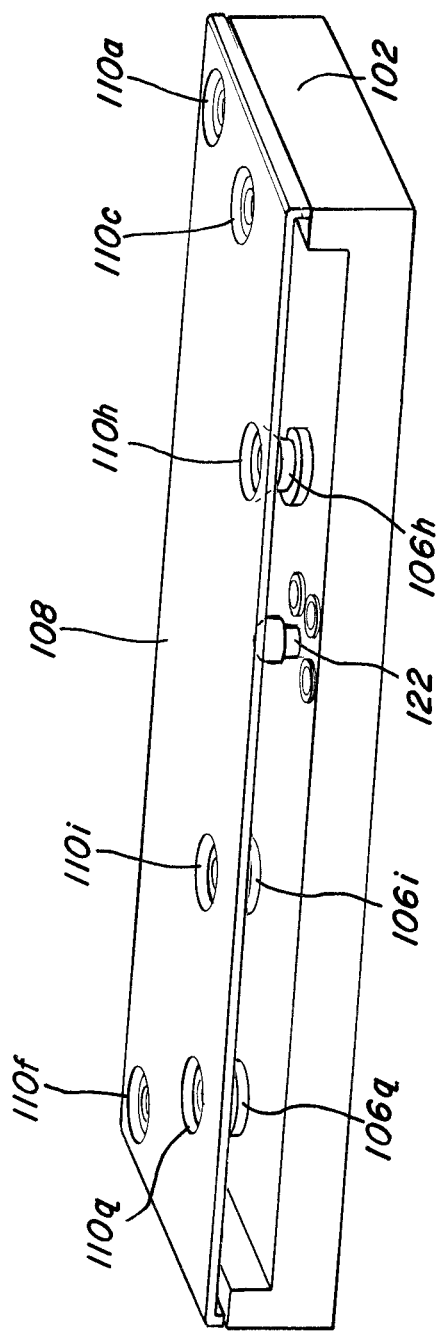
FIG. 4 depicts a top cover contacting a spring mounted probe and a pin in a block gage according to an embodiment.
Figure 5:
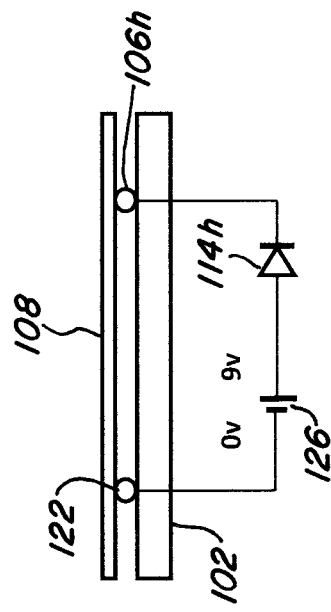
FIG. 5 depicts a circuit diagram of a top cover contacting a spring mounted probe and a pin in a block gage according to an embodiment.

In an embodiment shown in FIGS. 4 and 5, the cover 108 is depressed further and contacts both the spring mounted probe 122 and the pin 106*h*. As can be seen in FIG. 5, the completable circuit formed by the pin 106*h* is completed when the top cover 108 contacts the pin 106*h* and the spring mounted probe 122.

In an embodiment, since the pins 106 are electrically isolated from each other, the contact of a first pin by the top cover 108 will not complete a circuit for a second pin. For example, the contact by the top cover 108 with the pin 106*h* and the spring mounted probe 122 will not complete a circuit for the pin 106*a*. The circuit for the pin 106*a* will be completed when the top cover 108 contacts the pin 106*a* and the spring mounted probe 122.

In step 604, the top cover indicator 114*h* indicates that the top cover 108 contacts the pin 106*h* when the top cover 108 contacts the pin 106*h* and the spring mounted probe 122. For example, in FIGS. 2 and 3, the top cover 108 contacts the spring mounted probe 122, but not the pin 106*h*. Thus, the completable circuit is not complete, and the top cover indicator 114*h* will not indicate that the top cover 108 contacted the pin 106*h*. However, as seen in FIGS. 4 and 5, the top cover 108 contacts the pin 106*h* and the spring mounted probe 122, thereby completing the complete circuit. Thus, the top cover indicator 114*h* will indicate that the top cover 108 contacted the pin 106*h*.

In an embodiment, the compression tool used to compress the top cover 108 onto the block unit can be adjusted based on the verification system 100. For example, if after compression, the top cover 108 does not contact one or more of the pins 106*a*-106*i* as indicated by the top cover indicators 106*a*-106*i*, then adjustments to the compression tool can be made to selectively increase force placed on the top cover 108 during compression to ensure that the top cover 108 now contacts the pins 106*a*-106*i* which were previously not contacted. In an embodiment, this can ensure that the top cover 108 maintains a metal-to-metal contact with the base unit at the top cover contact points.

Similarly, if after compression, the top cover 108 contacts one or more of the pins 106*p*-106*s* as indicated by the top cover contact indicators 106, then adjustments to the compression tool can be made to selectively decrease force on the top cover 108 during compression to ensure that the top cover 108 now does not contact the pins 106*p*-106*s* which were previously contacted. In an embodiment, this can ensure that the top cover 108 does not contact the base unit at a keep out point, which can reduce the likelihood of damage to a storage media, a disk clamp, or a head stack assembly.

Those of ordinary skill would appreciate that the various illustrative logical blocks, modules, and algorithm parts described in connection with the examples disclosed herein may be implemented as electronic hardware, computer software, or combinations of both. Furthermore, the embodiments can also be embodied on a machine readable medium causing a processor or computer to perform or execute certain functions.

To clearly illustrate this interchangeability of hardware and software, various illustrative components, blocks, modules, circuits, and process parts have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed apparatus and methods.

The parts of a method or algorithm described in connection with the examples disclosed herein may be embodied directly in hardware, in a software module executed by a processor, or in a combination of the two. The parts of the method or algorithm may also be performed in an alternate order from those provided in the examples. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC).

The previous description of the disclosed examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed method and apparatus. The described embodiments are to be considered in all respects only as illustrative and not restrictive and the scope of the disclosure is, therefore, indicated by the appended claims rather than by the foregoing description. All changes which come within the meaning and range of equivalency of the claims are to be embraced within their scope.

What is claimed is:

1. A verification system for determining storage device top cover compression effectiveness comprising:
 a block gage configured to connect to a voltage source comprising a ground terminal and a positive terminal, and to receive a top cover configured to mate with a base unit for a storage device, the block gage comprising:
  a plurality of pins, each of which being configured to:
   be electrically insulated from each other,
   form a completable circuit,
   be electrically connected to the positive terminal, and
   correspond in location and height to a top cover contact point in the base unit or a keep out point in the base unit; and
  a spring mounted probe configured to be electrically connected to the ground terminal,
  wherein when the top cover contacts the spring mounted probe and a pin of the plurality of pins, a completable circuit for the contacted pin is completed,
 thereby indicating that the top cover contacted the contacted pin.

2. The system of claim 1 further comprising:
 a display unit configured to connect to the block gage comprising:
  a plurality of top cover contact indicators, each of which being configured to:
   correspond to a pin of the plurality of pins,
   be electrically connected between the positive terminal and the corresponding pin, and
   indicate when the top cover has contacted the corresponding pin.

3. The system of claim 2 wherein each of the top cover contact indicators is further configured to activate and indicate that the top cover has contacted the corresponding pin, when the top cover contacts the spring mounted probe and the corresponding pin, thereby completing a completable circuit of the corresponding pin.

4. The system of claim 2 wherein the plurality of top cover contact indicators comprises:
 a first set of top cover contact indicators, each of which being configured to correspond to a pin of the plurality of pins that is configured to correspond in location and height to the top cover contact point; and
 a second set of top cover contact indicators, each of which being configured to correspond to a pin of the plurality of pins that is configured to correspond in location and height to the keep out point.

5. The system of claim 4 wherein the first set of top cover contact indicators includes a first type of top cover contact indicators, and the second set of top cover contact indicators includes a second type of top cover contact indicators different than the first type of top cover contact indicators.

6. The system of claim 4 wherein the first set of top cover contact indicators comprises a first set of light emitting diodes ("LEDs") comprising a first color, and the second set of top cover contact indicators comprises a second set of LEDs comprising a second color different than the first color.

7. The system of claim 1 wherein at least one of the top cover contact points comprises a fastener reception unit.

8. The system of claim 1 wherein at least one of the keep out points comprises a location in the base unit where the top cover should not contact the base unit.

9. The system of claim 8 wherein the location comprises a location of a storage media, a disk clamp, or a head stack assembly.

10. A method for determining storage device top cover compression effectiveness using a verification system comprising a display unit and a block gage configured to be connected to the display unit and a voltage source comprising a ground terminal and a positive terminal, and to receive a top cover configured to mate with a base unit for a storage device, the block gage comprising a spring mounted probe configured to be electrically connected to the ground terminal, and a plurality of pins, each of which being configured to be electrically insulated from each other, be electrically connected to the positive terminal, and correspond in location and height to a top cover contact point in the base unit or a keep out point in the base unit, the method comprising:
 placing the top cover over the block gage to contact the spring mounted probe and a pin of the plurality of pins on the block gage; and
 indicating that the top cover contacted the contacted pin when the top cover contacts the contacted pin and the spring mounted probe.

11. The method of claim 10 wherein the display unit comprises:
 a plurality of top cover contact indicators, each of which being configured to:
  correspond to a pin of the plurality of pins,
  be electrically connected between the positive terminal and the corresponding pin, and indicate when the top cover has contacted the corresponding pin.

12. The method of claim 11 wherein the indicating step further comprises activating the top cover contact indicator corresponding to the contacted pin when the top cover contacts the spring mounted probe and the contacted pin.

13. The method of claim 11 wherein the plurality of top cover contact indicators comprises:
   a first set of top cover contact indicators, each of which being configured to correspond to a pin of the plurality of pins that is configured to correspond in location and height to the top cover contact point; and
   a second set of top cover contact indicators, each of which being configured to correspond to a pin of the plurality of pins that is configured to correspond in location and height to the keep out point.

14. The method of claim 13 wherein the first set of top cover contact indicators includes a first type of top cover contact indicators, and the second set of top cover contact indicators includes a second type of top cover contact indicators different than the first type of top cover contact indicators.

15. The method of claim 14 wherein the indicating step further comprises:
   activating a top cover indicator in the first set of top cover indicators when the contacted pin is configured to correspond in location and height to the top cover contact point; and
   activating a top cover indicator in the second set of top cover indicators when the contacted pin is configured to correspond in location and height to the keep out point.

16. The method of claim 13 wherein the first set of top cover contact indicators comprises a first set of light emitting diodes ("LEDs") comprising a first color, and the second set of top cover contact indicators comprises a second set of LEDs comprising a second color different than the first color.

17. The method of claim 10 wherein at least one top cover contact point comprises a fastener reception unit.

18. The method of claim 10 wherein at least one keep out point comprises a location in the base unit where the top cover should not contact the base unit.

19. The method of claim 18 wherein the location comprises a location of a storage media, a disk clamp, or a head stack assembly.

* * * * *